(12) United States Patent
Gray

(10) Patent No.: US 8,155,526 B2
(45) Date of Patent: Apr. 10, 2012

(54) IN-WALL OPTICAL NETWORK UNIT

(75) Inventor: Barry C. Gray, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 585 days.

(21) Appl. No.: 12/210,744

(22) Filed: Sep. 15, 2008

(65) Prior Publication Data

US 2009/0087181 A1    Apr. 2, 2009

Related U.S. Application Data

(60) Provisional application No. 60/976,707, filed on Oct. 1, 2007.

(51) Int. Cl.
*H04B 10/00* (2006.01)
*H04L 12/66* (2006.01)

(52) U.S. Cl. ........ 398/116; 398/115; 398/117; 398/135; 398/138; 398/67; 398/100; 370/463

(58) Field of Classification Search .................... 398/25, 398/33, 43, 45, 48, 58, 66, 67, 98–100, 115, 398/135, 155; 370/249, 463
See application file for complete search history.

(56) References Cited

U.S. PATENT DOCUMENTS

| | | | |
|---|---|---|---|
| 5,267,122 A | 11/1993 | Glover | |
| 6,343,019 B1 | 1/2002 | Jiang et al. | |
| 6,543,940 B2 * | 4/2003 | Chu | 385/53 |
| 6,735,709 B1 | 5/2004 | Lee et al. | |
| 7,181,142 B1 * | 2/2007 | Xu et al. | 398/66 |
| 7,230,926 B2 * | 6/2007 | Sutherland et al. | 370/241 |
| 7,428,586 B2 * | 9/2008 | Sutherland et al. | 709/224 |
| 7,609,967 B2 * | 10/2009 | Hochbaum et al. | 398/67 |
| 7,693,178 B2 * | 4/2010 | Wojtowicz | 370/463 |
| 7,778,545 B2 * | 8/2010 | Haran et al. | 398/67 |
| 7,869,710 B2 * | 1/2011 | Lee et al. | 398/33 |
| 7,873,039 B2 * | 1/2011 | Tal et al. | 370/389 |
| 7,925,164 B2 * | 4/2011 | Sitton et al. | 398/72 |
| 7,957,650 B2 * | 6/2011 | Pan et al. | 398/135 |
| 2002/0129215 A1 | 9/2002 | Yoo | |
| 2004/0081196 A1 | 4/2004 | Elliott | |
| 2005/0169632 A1 | 8/2005 | Song | |
| 2005/0174878 A1 | 8/2005 | Osaka | |
| 2005/0259589 A1 | 11/2005 | Rozmovits et al. | |
| 2006/0257149 A1 | 11/2006 | Hirth et al. | |
| 2007/0116466 A1 | 5/2007 | Gewirtzman et al. | |
| 2007/0153823 A1 | 7/2007 | Wojtowicz | |
| 2008/0159744 A1 | 7/2008 | Soto et al. | |
| 2008/0186878 A1 | 8/2008 | Zheng | |
| 2008/0298803 A1 * | 12/2008 | Warner et al. | 398/43 |
| 2009/0060509 A1 * | 3/2009 | Shimoosako et al. | 398/66 |

* cited by examiner

*Primary Examiner* — Loha Ben
(74) *Attorney, Agent, or Firm* — Sterne, Kessler, Goldstein & Fox P.L.L.C.

(57) ABSTRACT

One embodiment provides an ONU that includes an optical interface coupled to an optical transceiver, which is configured to transmit optical signals to and receive optical signals from an OLT through the optical interface. The ONU also includes an ONU chip coupled to the optical transceiver and configured to communicate with the OLT through the optical transceiver. The ONU further includes an Ethernet interface coupled to the ONU chip and a power management module configured to provide power to the ONU chip and the optical transceiver using power delivered from a CPE through the Ethernet interface. In addition, the ONU includes a circuit board to which the optical transceiver, the ONU chip, and the power management module are attached, and a wall-mountable fixture, wherein the front side of the fixture includes an opening for the Ethernet interface, and wherein the back side of the fixture holds the circuit board.

15 Claims, 6 Drawing Sheets

IN-WALL OPTICAL NETWORK UNIT

RELATED APPLICATION

This application hereby claims priority to U.S. Provisional Patent Application No. 60/976,707, filed Oct. 1, 2007.

BACKGROUND

1. Field of the Invention

The present invention relates to the design of an optical network unit (ONU). More specifically, the present invention relates to the design of an in-wall ONU powered via Power-over-Ethernet (PoE) which could be supplied by Customer Premises Equipment (CPE) such as a home network gateway or an enterprise router.

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE). Examples of a CPE include a home network gateway, a Gigabit Ethernet (GbE) switch, or an enterprise router.

In the example of an Ethernet PON (EPON), communications can include downstream traffic and upstream traffic. In the following description, "downstream" refers to the direction from an OLT to one or more ONU, and "upstream" refers to the direction from an ONU to the OLT. In the downstream direction, because of the broadcast nature of the 1xN passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

A conventional ONU requires its own power supply in order to function. Such requirement is inconvenient to carriers who set up ONUs on customers' premises because it limits positions of the ONUs to places that are close to power outlets. Power outlets may be scarce within a customer's home or office, or may be far away from the point where the optical fiber of the access network, e.g., the EPON, enters the customer's premise. A single strand optical fiber that leaves the EPON to connect to the ONU, although protected by a fiber jacket, is still prone to environmental and mechanical damage, such as contamination of the fiber interface and pulling or acute bending of the fiber.

SUMMARY

One embodiment of the present invention provides an optical network unit (ONU). The ONU includes an optical interface and an optical transceiver coupled to the optical interface. The optical transceiver is configured to transmit optical signals to and receive optical signals from an optical line terminal (OLT) through the optical interface via interconnecting optical fiber and splitters. The ONU also includes an ONU chip coupled to the optical transceiver and configured to communicate with the OLT through the optical transceiver. The ONU further includes an Ethernet interface coupled to the ONU chip and a power management module configured to provide power to the ONU chip and the optical transceiver using power delivered from a customer-premises equipment (CPE) through the Ethernet interface, thereby allowing the ONU to be powered by the CPE through the Ethernet interface and providing a passive optical network (PON) uplink for the CPE without requiring a separate power supply. In addition, the ONU includes a circuit board to which the optical transceiver, the ONU chip, and the power management module are attached, and a wall-mountable fixture, wherein the front side of the fixture includes an opening for the Ethernet interface, and wherein the back side of the fixture holds the circuit board.

In a variation on this embodiment, the fixture can be installed in a wall, the optical interface is hidden in the wall, and an optical fiber coupled to the optical interface runs inside the wall, thereby protecting the optical interface and the optical fiber from environmental and mechanical damages.

In a further variation on this embodiment, the wall is an exterior wall of a customer's premises, and the back side of the fixture can be accessed from the outer surface of the exterior wall, thereby allowing the ONU to be serviced without the need to enter the premises.

In a variation on this embodiment, the fixture can be installed on the surface of a wall, and the optical interface is coupled to an optical fiber that runs inside a securely anchored conduit, thereby protecting the optical fiber from environmental and mechanical damages.

In a variation on this embodiment, the Ethernet interface includes an RJ45 socket, and the ONU can be coupled to the CPE through the Ethernet interface using an RJ45 cable.

In a variation on this embodiment, the ONU chip is configured to perform network management through an in-band management channel between the ONU and the OLT.

In a variation on this embodiment, the optical transceiver is a pluggable transceiver and is configured to transmit optical signals into and receive optical signals from a multi-mode or a single-mode optical fiber.

In a variation on this embodiment, the ONU chip comprises a die directly attached to the circuit board without conventional chip packaging.

In a variation on this embodiment, the ONU further includes one or more LEDs coupled to the ONU chip and configured to indicate the ONU's status.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

Passive Optical Network Topology

Figure 1:
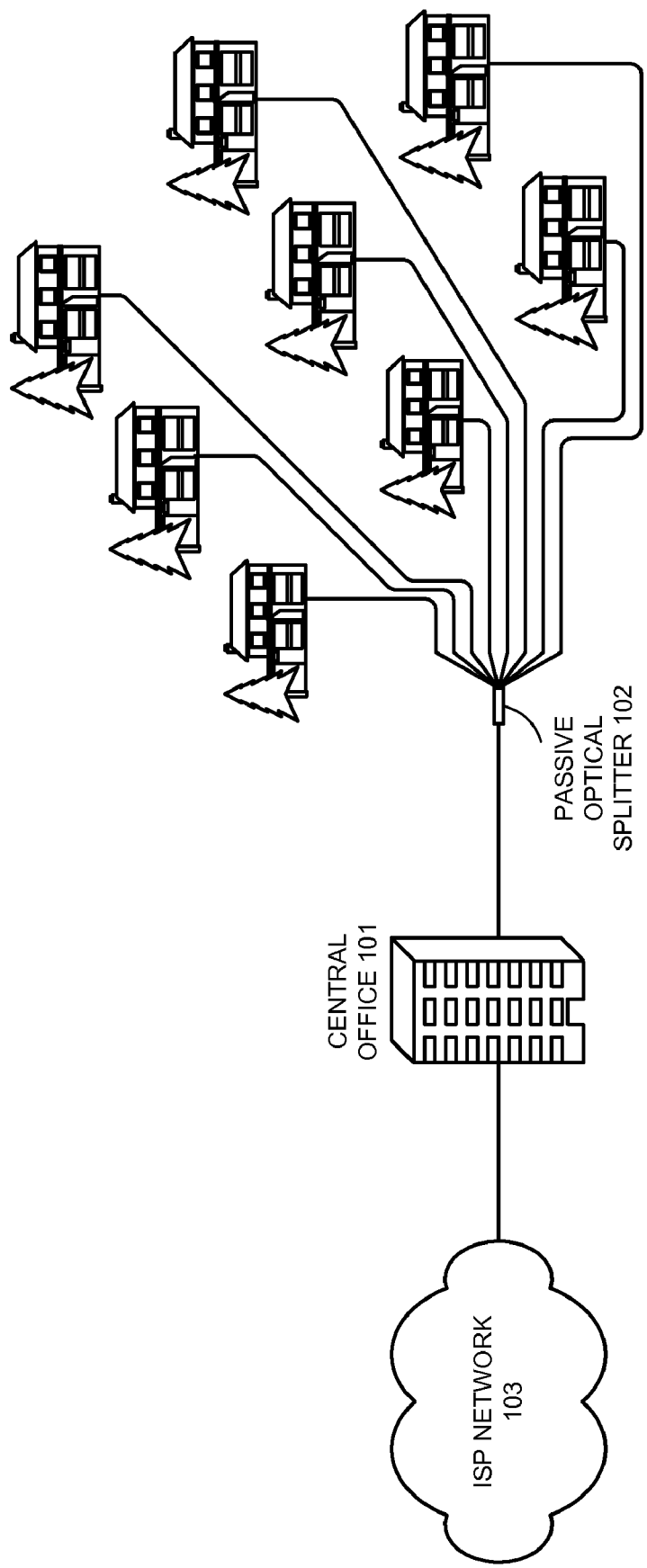
FIG. 1 illustrates a PON wherein a central office and a number of customers are coupled through optical fibers and a passive optical splitter (prior art).

FIG. 1 illustrates a passive optical network including a central office and a number of customers coupled through optical fibers and a passive optical splitter (prior art). A passive optical splitter 102 and optical fibers couple the customers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs).

An EPON Configuration with Conventional ONUs

Figure 2:
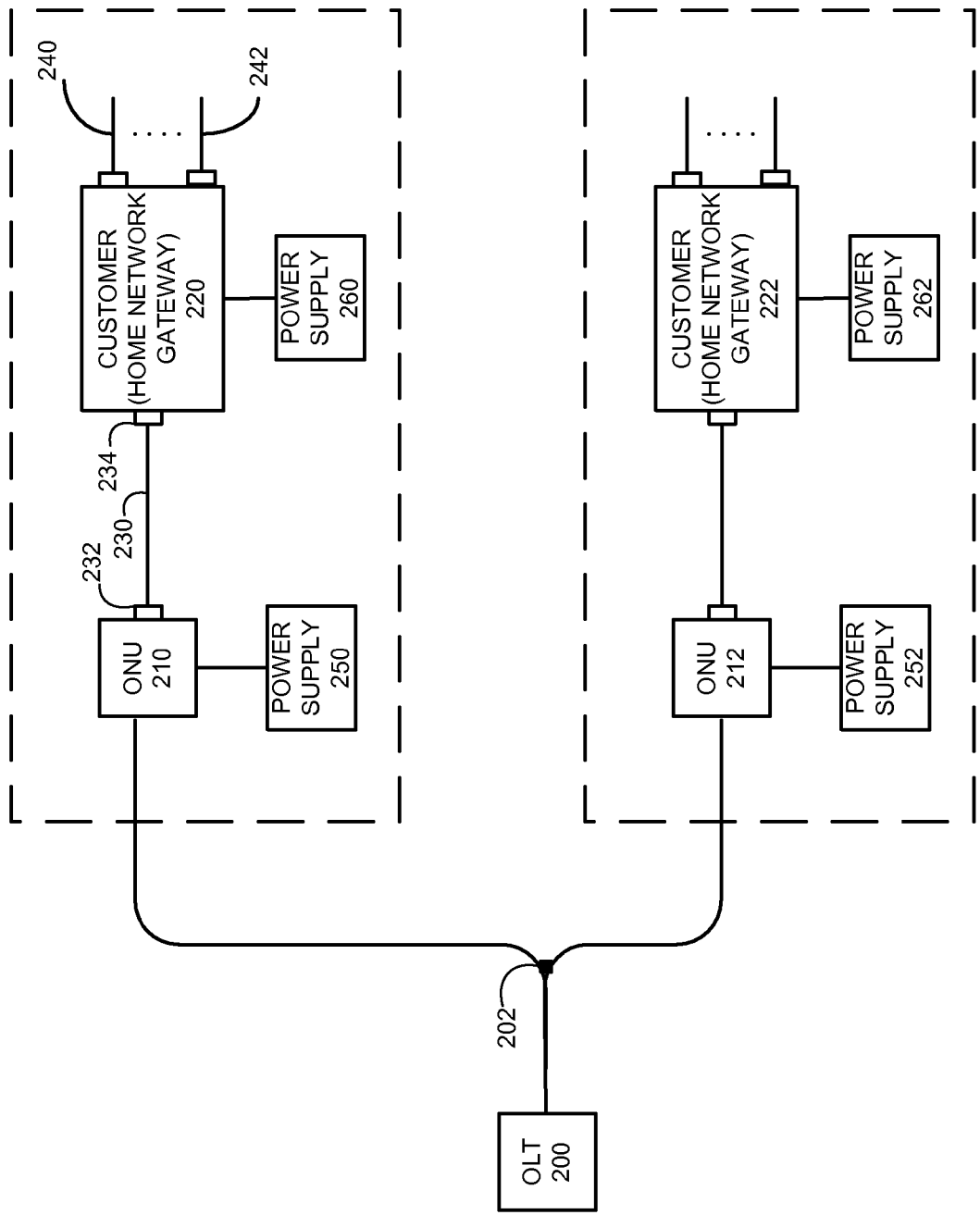
FIG. 2 illustrates a conventional EPON configuration wherein the ONUs are powered by separate power supplies (prior art).

FIG. 2 illustrates an EPON configuration that deploys conventional ONUs (prior art). In FIG. 2, an OLT 200 broadcasts downstream data to ONUs 210 and 212. While both ONUs receive the same copy of downstream data, each ONU selectively forwards only the data destined to its corresponding customer, which in this example are customers 220 and 222. Note that in this example each customer is equipped with a home network gateway which can be an Ethernet switch that communicates with the corresponding ONU. In general, on the local side, an ONU is in communication with a piece of customer-premises equipment (CPE), which can include a home network gateway, a Gigabit Ethernet (GbE) switch, or other telecommunication equipment.

The downstream optical signal is divided by an optical splitter 202. Optical splitter 202 also functions as a combiner for upstream signals from different ONUs. Each ONU receives the downstream optical signals and retrieves data which is destined to its corresponding customer based on the LLID of each packet.

An ONU is coupled to its corresponding customer through a communication link. For example, ONU 210 is coupled to the home network gateway of customer 220 through a communication link 230. Communication link 230 can be an optical link, such as an optical fiber, or an electrical link, such as a copper cable or twisted wire. In addition, ONU 210 includes a transceiver interface 232 to transmit to and receive signals from customer 220. Similarly, the home network gateway of customer 220 includes a transceiver interface 234 to communicate with ONU 210.

The home network gateway of customer 220 receives signals from ONU 210 and delivers signals to different components of the premises network of customer 220 via different links, such as links 240 and 242. Examples of premises network components include a desktop computer, a laptop computer, and an IP phone.

The home network gateways of customers 220 and 222 are equipped with power supplies 260 and 262, respectively. In addition, ONUs 210 and 212 are also equipped with their own power supplies 250 and 252, respectively. These power supplies provide power to the ONUs to enable their operations.

Note that ONUs connect to a carrier's access network and are generally provided and installed by the carrier. Providing ONUs with separate power supplies has made the placement of ONUs a challenge to the carrier. To avoid using long power cords, it is preferable to place ONUs at places closer to power outlets. This condition might be hard to meet, especially for cases in which ONUs are placed outside of customers' premises. Another concern of the carrier regarding the ONUs' placement is the protection of optical fibers. Although usually protected by fiber jackets, optical fibers are still prone to mechanical damages, such as intensive pulling and acute bending. In addition, fiber connectors are prone to damage caused by environmental factors such as extreme temperatures and dust.

Gateway Powered ONU

To overcome these issues, embodiments of the present invention provide an ONU which can be powered by a home network gateway or other types of CPE, thereby eliminating the need for a separate power supply. As an example, FIG. 3 illustrates an EPON configuration which deploys home network gateway powered ONUs in accordance with one embodiment of the present invention.

Figure 3:
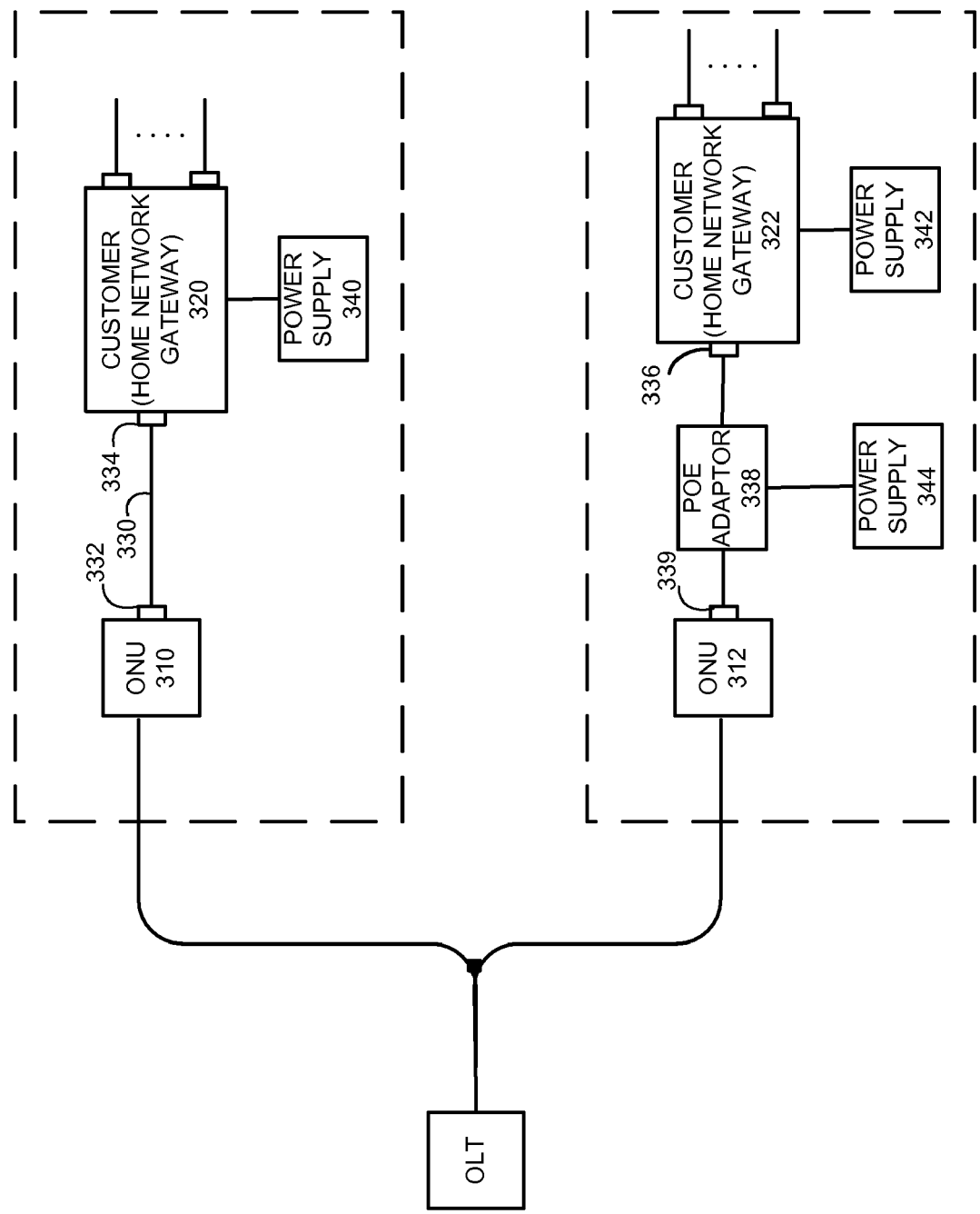
FIG. 3 illustrates an EPON configuration wherein ONUs are powered by home network gateways in accordance with an embodiment of the present invention.

In the scenario shown in the upper part of FIG. 3, the home network gateway of customer 320 powered by power supply 340 has the ability to provide electrical power through its transceiver interface 334. In one embodiment, transceiver interface 334 is an Ethernet interface enabled to transmit electrical power, or is Power-over-Ethernet (PoE) enabled. Electrical power is delivered to ONU 310 through communication link 330 and transceiver interface 332. In one embodiment, communication link 330 is a standard Ethernet cable and transceiver interface 332 is a PoE-enabled Ethernet interface.

In the scenario shown in the lower part of FIG. 3, the home network gateway of customer 322 powered by power supply 342 does not have the ability to provide electrical power through its transceiver interface 336. In one embodiment, transceiver interface 336 is a regular Ethernet interface which is not PoE enabled. In other words, the home network gateway of customer 322 is not PoE enabled. In order to provide electrical power to ONU 312, in one embodiment, a PoE adaptor 338 couples transceiver interface 336 of the home network gateway and transceiver interface 339 of ONU 312. PoE adaptor 338 receives communication signals from transceiver interface 336 and electrical power from power supply 344, and transmits them simultaneously to ONU 312 through transceiver interface 339. In one embodiment, transceiver interface 339 is a PoE-enabled Ethernet interface.

Figure 4C:
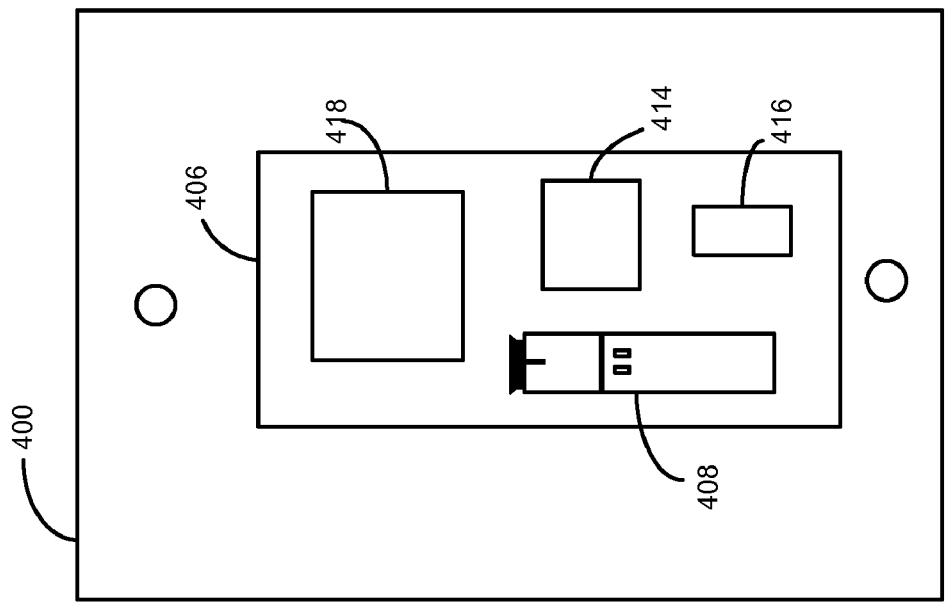
FIG. 4C illustrates the back view of an exemplary ONU in accordance with an embodiment of the present invention.
Figure 4B:
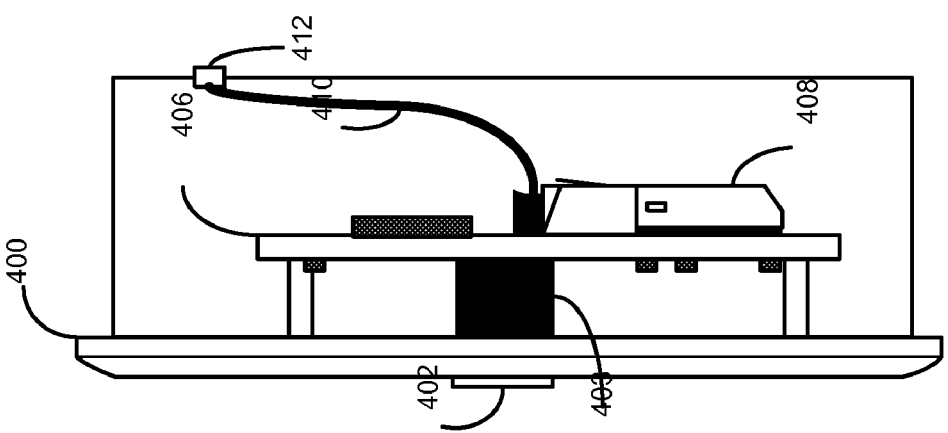
FIG. 4B illustrates the side view of an exemplary ONU in accordance with an embodiment of the present invention.
Figure 4A:
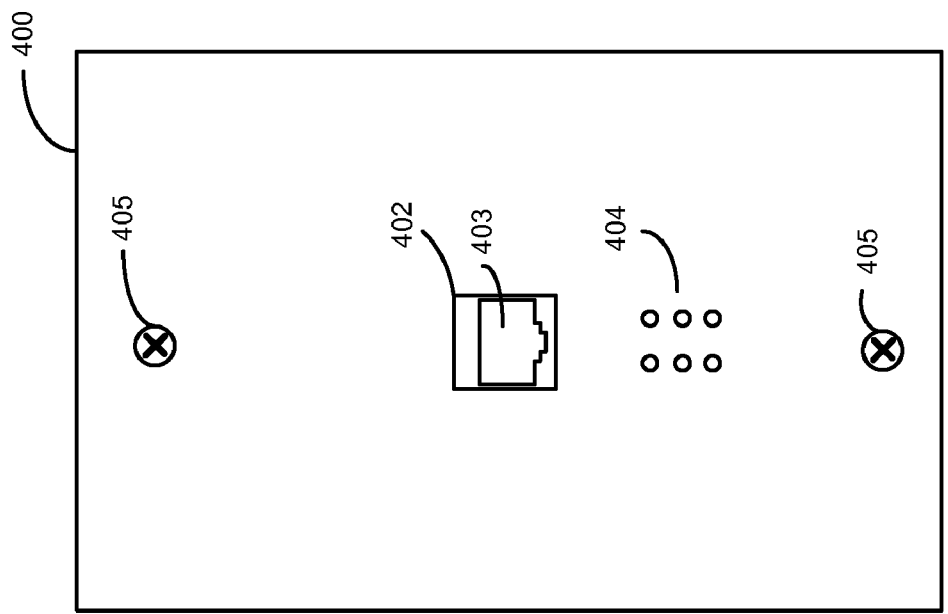
FIG. 4A illustrates the front view of an exemplary ONU in accordance with an embodiment of the present invention.

FIGS. 4A-4C illustrate an exemplary home network gateway powered ONU in accordance with one embodiment of the present invention. FIG. 4A illustrates the front view of the home network gateway powered ONU. In FIG. 4A, the front side of a wall-mountable fixture 400 includes an opening 402 that exposes an Ethernet interface 403. Ethernet interface 403 is configured to receive Ethernet signals and electrical power from home network gateway using an Ethernet cable. In one embodiment, Ethernet interface 403 is an RJ45 socket. The front side of fixture 400 also includes a group of LEDs 404 which indicate the status of the ONU. In one embodiment, the status of the ONU includes the power status and ONU operating mode. In one embodiment, fixture 400 is mounted in a wall by screws 405.

FIG. 4B illustrates the side view of the ONU showing a circuit board 406 attached to the back side of fixture 400. In one embodiment, circuit board 406 is a printed circuit board (PCB). An optical transceiver 408 is attached to circuit board 406. Optical transceiver 408 includes an optical fiber 410 that couples to an optical fiber on the carrier side, i.e., the EPON fiber, through a fiber connector 412. Optical transceiver 408 transmits optical signals to and receives optical signals from an OLT through connector 412. Transceiver 408 is capable of simultaneous transmitting and receiving. That is, transceiver 408 can transmit an upstream signal into and receive a downstream signal from the same fiber, wherein the two signals are on two wavelengths, and wherein the fiber can be a single-mode or multi-mode fiber.

FIG. 4C illustrates the back view of the ONU showing that, in addition to optical transceiver 408, an ONU chip 414, a flash memory 416, and a power management module 418 are also attached to circuit board 406. ONU chip 414 couples to Ethernet interface 403 and optical transceiver 408, and performs main ONU functions, such as extracting data designated for the local customer based on each packet's LLID and transmission scheduling for upstream data. Note that in one embodiment, ONU chip 414 includes the necessary buffer for storing downstream and upstream data, and can implement queue-management schemes based on pre-defined or user-configured service level agreements (SLAs). Flash memory 416 is coupled to ONU chip 414 through a Serial Peripheral Interface (SPI). Serial flash memory 416 stores the programs and the initial boot-up configurations, which are loaded by ONU chip 414 upon power-up. Note that the content within flash memory 416 can be updated by the OLT through an in-band control and management channel. Hence, the ONU can perform network management based on the information sent by the OLT. Power management module 418 is configured to receive electrical power from Ethernet interface 403 and to supply electrical power to transceiver 408 and ONU chip 414. ONU chip 414 and power management module 418 couple to LEDs 404 which indicate the status of the ONU.

In further embodiments, the integrated circuits, such as ONU chip 414, flash memory 416, power management module 418, can be directly attached to the underlying circuit board 406 without individual packaging. That is, an IC die is attached directly to circuit board 406, and conductive wires are bonded to the IC connects and conductive regions on the circuit board. The die is typically covered with epoxy.

Being able to deliver power to an ONU from a home network gateway (or other types of CPE) using the same Ethernet cable that delivers data signals provides demarcation flexibility. The carrier can now place the demarcation point, which is the point that the carrier's access network ends and the customer's home network begins, at a location that satisfies the need of both the carrier and the customer. Without requiring a separate power supply, an ONU can be placed at places that are hidden from the customer, such as inside a wall or outside the customer's home. In both cases, only the Ethernet interface of the ONU is exposed to the customer. Keeping the ONU away from the customer makes it easier for the carrier to protect and maintain the ONU. In addition, the isolation between the ONU and the home network gateway also provides the customer the ability to upgrade his home network gateway without disturbing the carrier's access network, i.e., the EPON.

Figure 5:
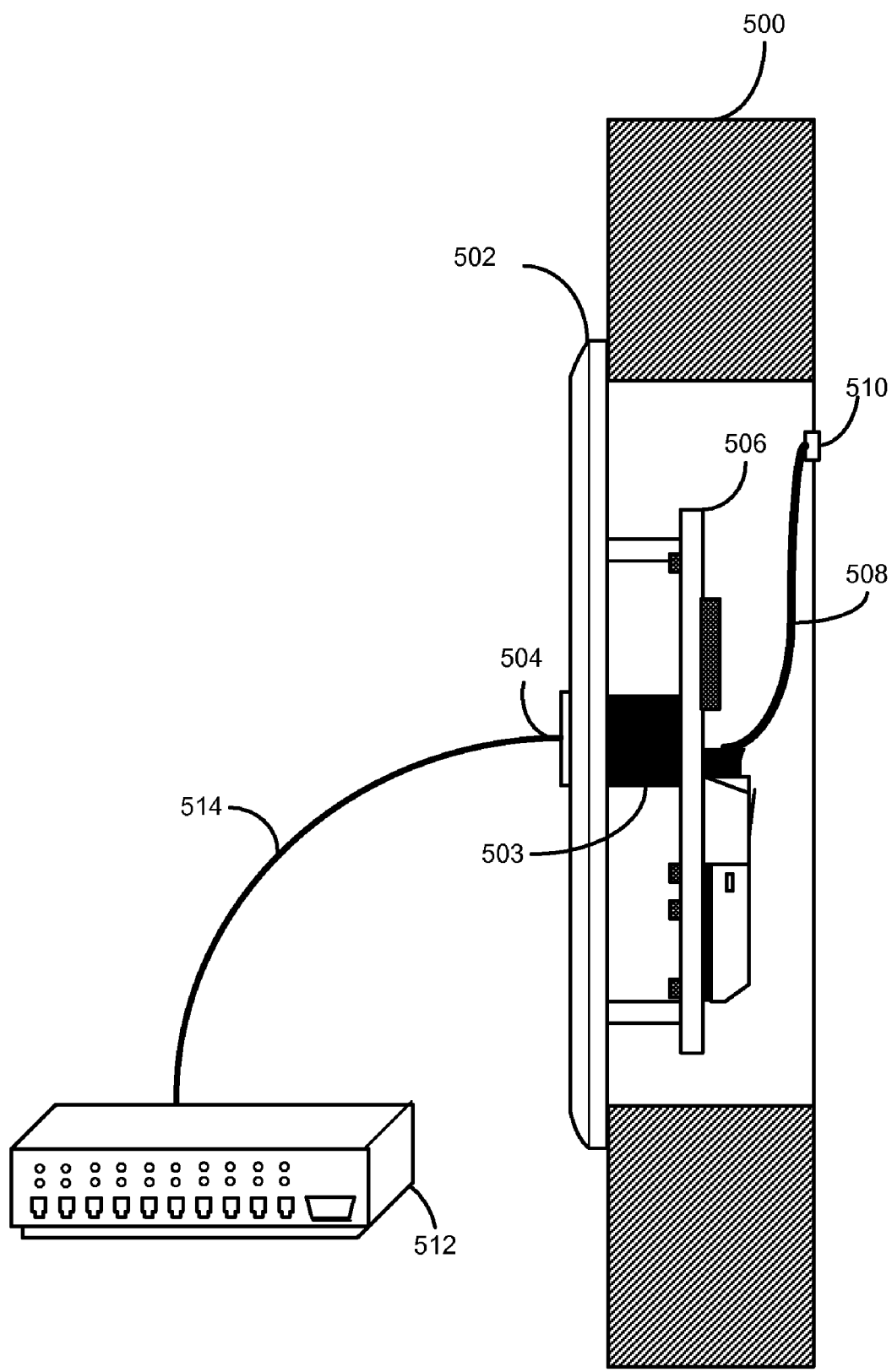
FIG. 5 illustrates an exemplary placement of an ONU in accordance with an embodiment of the present invention.

FIG. 5 illustrates an ONU hidden in a wall in accordance with one embodiment of the present invention. In FIG. 5, wall 500 can be either an exterior wall or an interior wall of a customer's premises. Wall-mountable fixture 502 is mounted in the wall with circuit board 506 embedded inside wall 500. Ethernet interface 503 is exposed to one surface of the wall through opening 504. Optical fiber 508 travels inside the wall and is connected to fiber connector 510 which is located at the other surface of wall 500. Note that if wall 500 is an exterior wall, Ethernet interface 503 is located at the inner surface, whereas fiber connector 510 at the outer surface. With this configuration, most parts of the ONU are hidden from the customer, who only sees the front side of fixture 502 including opening 504 exposing Ethernet interface 503. Note that the front side of fixture 502 looks similar to a conventional telephone or Ethernet jack mounted in the wall. Similarly to plugging in a telephone line, a customer can conveniently plug an Ethernet cable 514 into interface 503 through opening 504 to connect his home network gateway 512 to the ONU. In one embodiment, Ethernet cable is an RJ45 cable. In a further embodiment, wall 500 is an exterior wall and fiber connector 510 is exposed to the outside of the customer's home, which gives the carrier access to the ONU without the need to enter the customer's home. In another embodiment, fiber connector 510 can be hidden inside the wall, thus protecting connector 510 from potential environmental damage such as dirt and other contaminants. Furthermore, the outer surface of the exterior wall can include an opening for accessing circuit board 506 and fiber 508, thus enabling the carrier to service or maintain the ONU without the need to enter the customer's home.

Figure 6:
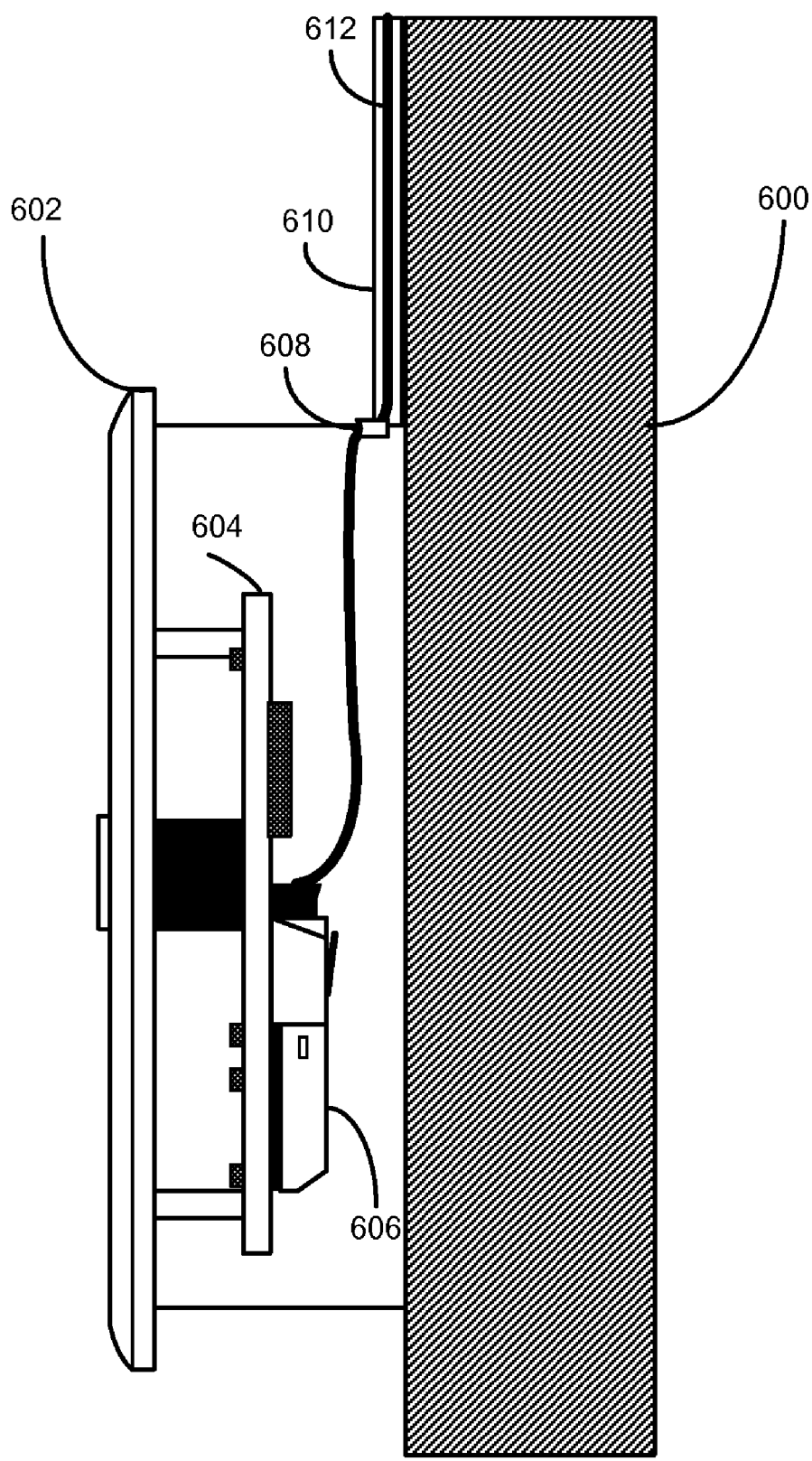
FIG. 6 illustrates an exemplary placement of an ONU in accordance with an embodiment of the present invention.

FIG. 6 illustrates an ONU attached to the surface of a wall in accordance with one embodiment of the present invention. In FIG. 6, wall-mountable fixture 602 is mounted on the surface of wall 600 with circuit board 604 outside of wall 600. An optical transceiver 606 is coupled to the carrier's access network using an optical fiber 612 through a fiber connector 608. In one embodiment, optical fiber 612 is placed inside a securely anchored conduit 610 which protects the fiber from accidental mechanical damage. In another embodiment, optical fiber 612 is embedded inside wall 600.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An optical network unit (ONU), comprising:
   an optical transceiver configured to transmit optical signals to and receive optical signals from an optical line terminal (OLT);
   an ONU controller configured to communicate with the OLT through the optical transceiver to perform ONU functions;
   a power management module configured to provide power to the ONU controller and the optical transceiver using power delivered from a customer-premises equipment (CPE) through an Ethernet interface; and
   a wall-mountable fixture that is configured to hold at least one of the ONU controller, the power management module, and the optical transceiver.

2. The ONU of claim 1, wherein the wall-mountable fixture is further configured to hold the Ethernet interface.

3. The ONU of claim 1,
   wherein the optical transceiver is coupled to an optical fiber.

4. The ONU of claim 1, wherein the ONU controller is configured to perform network management functions through an in-band management channel between the ONU and the OLT.

5. The ONU of claim 1, wherein the optical transceiver is a pluggable transceiver and is configured to transmit and receive optical signals over a multi-mode or a single-mode optical fiber.

6. The ONU of claim 1, wherein the ONU controller comprises a die directly attached to a circuit board without conventional chip packaging.

7. The ONU of claim 1, further comprising:
   one or more LEDs, coupled to the ONU controller, configured to indicate the ONU's status.

8. An optical network unit (ONU), comprising:
   an optical transceiver configured to transmit optical signals to and receive optical signals from an optical line terminal (OLT);
   an ONU controller configured to communicate with the OLT through the optical transceiver to perform ONU functions:;and
   a power management module configured to provide power to the ONU controller and the optical transceiver using power delivered from a customer-premises equipment (CPE) through an Ethernet interface,
   wherein the ONU is configured to be coupled to the CPE through the Ethernet interface using an RJ45 cable.

9. A fixture, comprising:
   an optical transceiver configured to transmit optical signals to and receive optical signals from an optical line terminal (OLT);
   an ONU controller coupled to the optical transceiver and configured to communicate with the OLT through the optical transceiver to perform ONU functions;
   an Ethernet interface;
   a power management module configured to provide power to the ONU controller and the optical transceiver using power delivered from a customer-premises equipment (CPE) through the Ethernet interface; and
   a wall-mountable fixture that is configured to hold at least one of the ONU controller, the power management module, the optical transceiver, and the Ethernet interface.

10. The fixture of claim 9, wherein the optical transceiver is coupled to an optical fiber.

11. The fixture of claim 9, wherein the Ethernet interface comprises an RJ45 socket.

12. The fixture of claim 9, wherein the ONU controller is configured to perform network management functions through an in-band management channel between the ONU and the OLT.

13. The fixture of claim 9, wherein the optical transceiver is a pluggable transceiver and is configured to transmit and receive optical signals over a multi-mode or a single-mode optical fiber.

14. The fixture of claim 9, wherein the ONU controller comprises a die directly attached to a circuit board without conventional chip packaging.

15. The fixture of claim 9, further comprising:
   one or more LEDs, coupled to the ONU controller, configured to indicate the ONU's status.

* * * * *

UNITED STATES PATENT AND TRADEMARK OFFICE
CERTIFICATE OF CORRECTION

PATENT NO. : 8,155,526 B2  
APPLICATION NO. : 12/210744  
DATED : April 10, 2012  
INVENTOR(S) : Barry C. Gray Page 1 of 1

It is certified that error appears in the above-identified patent and that said Letters Patent is hereby corrected as shown below:

Column 8, Line 7, delete "functions:;and" please replace with --functions; and--.

Signed and Sealed this  
Tenth Day of July, 2012

David J. Kappos  
*Director of the United States Patent and Trademark Office*